Aug. 19, 1924.

O. D. PARK 1,505,487

FRUIT PICKING DEVICE

Filed March 27, 1923

Inventor
O. D. Park
By D. Swift
Attorney

Patented Aug. 19, 1924.

1,505,487

UNITED STATES PATENT OFFICE.

ORSON D. PARK, OF ALDEN, MICHIGAN.

FRUIT-PICKING DEVICE.

Application filed March 27, 1923. Serial No. 628,042.

*To all whom it may concern:*

Be it known that I, ORSON D. PARK, a citizen of the United States, residing at Alden, in the county of Antrim, State of Michigan, have invented a new and useful Fruit-Picking Device; and I do hereby declare the following to be a full, clear, and exact description of the invention, such as will enable others skilled in the art to which it appertains to make and use the same.

The invention relates to fruit picking devices, and has for its object to provide a device of this character, preferably formed from sheet metal, and comprising a receptacle adapted to be secured to the wrist and forearm of a fruit picker and into which receptacle, fruit as picked, may be dropped by the operator and accumulated until it is desirable to dump the same into a receptacle.

A further object is to provide one side of the receptacle with a concavity adapted to receive the wrist and a portion of the forearm of the operator, and to provide straps for encircling the wrist and forearm of the operator securing the device in place.

A further object is to provide the receptacle with a scoop shaped end having a turned up lip, and into which scoop shaped end, fruit may be dropped as picked, whether the operator is picking with the device in a horizontal position or a vertical position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
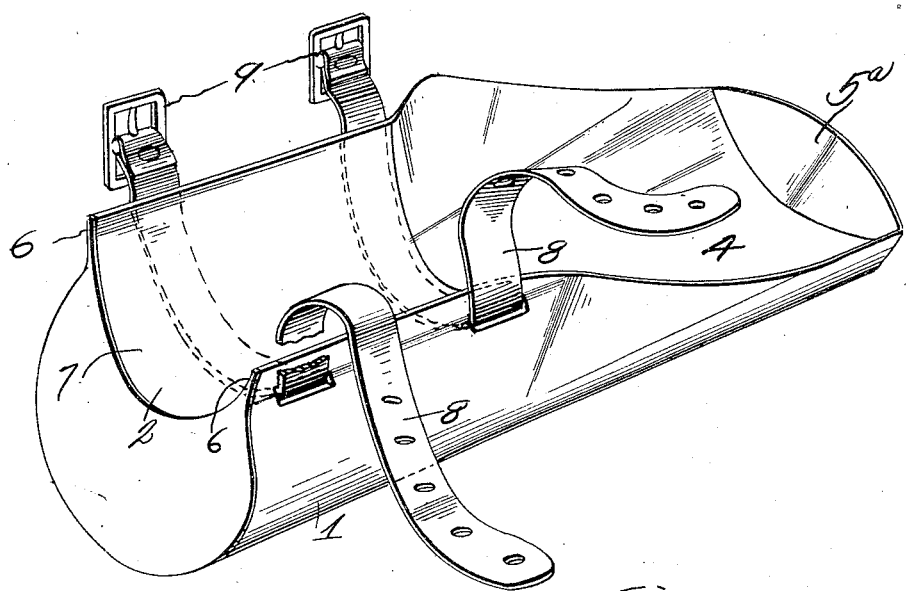
Figure 1 is a perspective view of the fruit picker.
Figure 2:
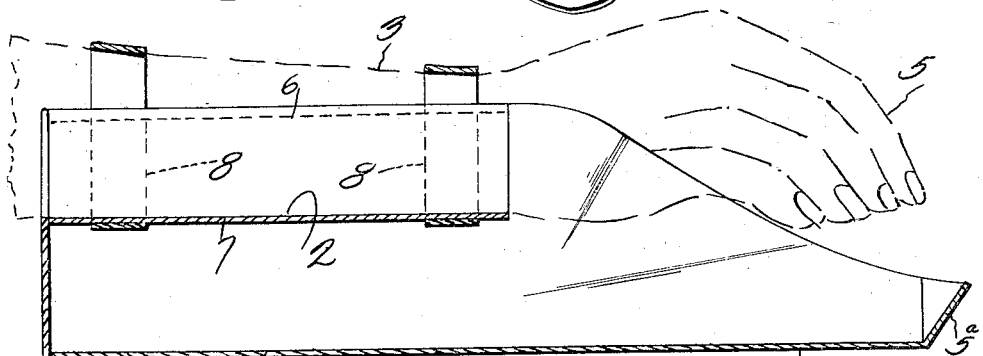
Figure 2 is a longitudinal sectional view through the picker.

Referring to the drawing, the numeral 1 designates a receptacle, which receptacle is substantially crescent shaped in transverse cross section and is provided with a longitudinally disposed recess 2 for the reception of the wrist 3 of the operator, said recess conforming substantially to the curvature of the wrist and forearm of the operator. By forming the receptacle 1 crescent shaped in cross section and providing the wrist receiving recess 2, a compact structure is provided, and one wherein the weight of the device is disposed adjacent the arm, especially when the device is being used for picking fruit from an overhead position, consequently the arm of the operator will not be easily tired by the weight of fruit within the receptacle. The forward end of the receptacle is provided with a scoop shaped extension 4, into which fruit is dropped from the operator's hand 5 during the picking operation. It will be seen that the fruit dropped into the scoop 4 will pass into the receptacle 1 when the scoop 4 is inclined upwardly, which may be done from time to time during the fruit picking operation. However if the picking is from overhead, for instance from a tree or tall bush, it will be seen that the fruit as deposited in the scoop will immediately roll into the receptacle 1. To prevent fruit from rolling out of the forward end of the scoop during the picking and depositing operation, the forward end of the scoop is provided with a transversely disposed flange $5^a$ against which the fruit will engage when the device is inclined downwardly and forwardly. From time to time during the fruit picking operation, as the fruit accumulates in the receptacle, the operator dumps the device into a receptacle, such for instance as a barrel or bucket. However considerable time is saved by allowing the fruit to accumulate in the receptacle 1 as the depositing or dumping operations are reduced to a minimum. It will also be seen that it will only be necessary for the operator to detach the fruit from the tree or bush and allow the same to drop into the scoop 4, thereby obviating the present practice of depositing each piece of fruit as picked into a bucket, barrel or other receptacle. Extending through the flanges 6 at the opposite sides of the receptacle and under the semi-circular shaped wall 7, forming the bottom of the arm receiving recess 2 are straps 8, which straps are adapted to encircle the wrist and forearm of the operator and be secured thereto by means of buckles 9. The straps 8 may be formed from any kind of material, however a soft material is preferred which prevents scraping or chafing of the arm of the operator.

From the above it will be seen that a fruit picking device is provided, which is simple in construction, formed from relatively cheap material, such for instance as sheet metal, and one wherein the time required for a fruit picking operation is reduced to a minimum.

The invention having been set forth what is claimed as new and useful is:—

A fruit picking device comprising an elongated receptacle in a longitudinally disposed recess of one side of which the arm of an operator is adapted to be received to a point adjacent the wrist of the operator, straps extending through said receptacle in engagement with the inner side of the wall forming the recess whereby said straps will not engage the inner side of the arm and bind the muscles thereof, the outer end of said receptacle merging into a flared scoop shaped member positioned below the hand of the operator, the end of said scoop shaped member being provided with an upwardly extending flange on which stems and branches may be broken, said flange being disposed beneath the plane of the hand and arm of the operator.

In testimony whereof I have signed my name to this specification in the presence of two subscribing witnesses.

ORSON D. PARK.

Witnesses:
 DALLAS H. PARK,
 F. M. MYERS.